United States Patent [19]

Noguchi et al.

[11] Patent Number: 4,618,250

[45] Date of Patent: Oct. 21, 1986

[54] PHOTOSENSITIVE DRUM CLEANING DEVICE IN ELECTROPHOTOGRAPHIC RECORDING SYSTEM

[75] Inventors: Matsusaburo Noguchi; Mikio Yamamoto; Tetsuji Kojima, all of Tokyo, Japan

[73] Assignee: Oki Electric Industry Co., Ltd., Tokyo, Japan

[21] Appl. No.: 742,965

[22] Filed: Jun. 10, 1985

[30] Foreign Application Priority Data

Jun. 11, 1984 [JP] Japan ............................... 59-118216

[51] Int. Cl.[4] ..................... G03G 21/00; A47L 13/40; B60S 1/28

[52] U.S. Cl. ..................................... 355/15; 15/256.5; 15/256.52; 118/652

[58] Field of Search .......................... 355/15; 118/652; 15/1.5 R, 256.5, 256.51, 256.52

[56] References Cited

U.S. PATENT DOCUMENTS

| | | | |
|---|---|---|---|
| 3,965,862 | 6/1976 | Yang et al. | 355/15 X |
| 4,140,389 | 2/1979 | Franke et al. | 355/15 |
| 4,181,425 | 1/1980 | Higaya et al. | 355/15 |
| 4,218,132 | 8/1980 | Iwai et al. | 355/15 |
| 4,325,628 | 4/1982 | Torigai et al. | 355/15 |
| 4,530,594 | 7/1985 | Adachi | 355/15 |

FOREIGN PATENT DOCUMENTS 55-2225 3/1980 Japan .

OTHER PUBLICATIONS

Herbert L. Bresnick, Vacuum-Less Cleaning and Reclaim System for Magnetic Toner/Media, vol. 5, No. 4, Jul./Aug. 1980, p. 445, Xerox Disclosure Journal.

*Primary Examiner*—Arthur T. Grimley
*Assistant Examiner*—C. Romano
*Attorney, Agent, or Firm*—Wenderoth, Lind & Ponack

[57] ABSTRACT

A cleaning device for a photosensitive drum a rotatable cylindrical device including a permanent magnet, for carrying toner wiped off the surface of the photosensitive drum, a scraper for making contact with the peripheral surface of the rotatable cylindrical device, and a rotary blade formed of a magnetic material. The rotary blade scrapes off the toner blocked by the scraper upon rotation of the rotary blade so as to force the toner to fall off for toner recovery.

6 Claims, 9 Drawing Figures

Fig. 3
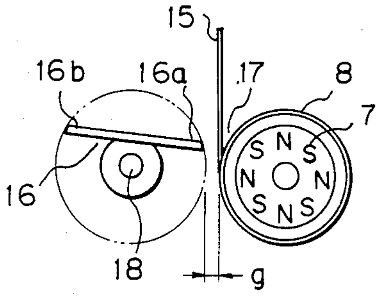
Fig. 5
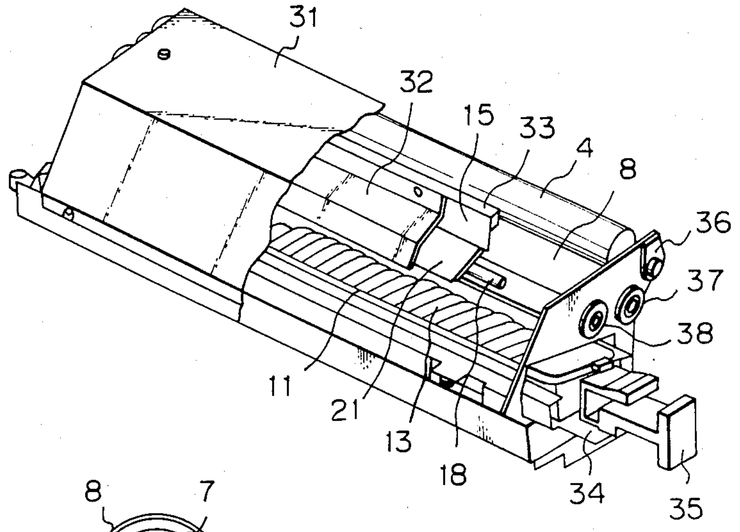
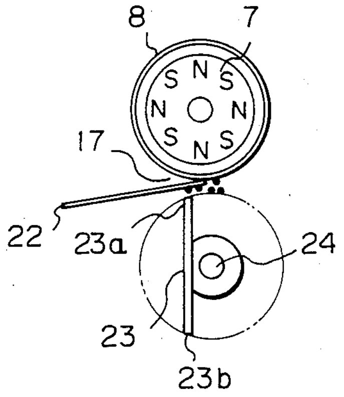
Fig. 6

PHOTOSENSITIVE DRUM CLEANING DEVICE IN ELECTROPHOTOGRAPHIC RECORDING SYSTEM

BACKGROUND OF THE INVENTION

1. Field of the Invention

The present invention relates to a photosensitive drum cleaning device used in an electrophotographic recording system.

2. Description of the Related Art

A prior electrophotographic recording system using magnetic toner employs a cleaning device for a photosensitive drum. This cleaning device serves to recover toner removed from the photosensitive drum, and is disclosed in a rotatable brush is employed for scraping residual toner off a photosensitive drum.

One prior device for recovering remaining toner removed from the surface of a photosensitive drum will hereinafter be described with reference to FIG. 1 of the accompanying drawings, FIG. 1 being a side elevational drawing illustrating one example of a prior cleaning device. As shown, a photosensitive drum 1 has a smooth surface and turns in the direction of the arrow. A toner image is formed via respective processes of charging, exposure, and development (not illustrated), and transferred onto paper by a transfer process. Denoted at 3*a* is residual toner not transferred onto the paper, but attached to the photosensitive drum 1. The residual toner 3*a* is wiped off the surface of the photosensitive drum 1 by a cleaning roll 4.

The cleaning roll 4 is made of a roll-shaped porous elastic material such as urethane sponge, etc. However, instead of this cleaning roll, a fur brush disclosed in U.S. Pat. No. 4,097,140 may also be used to achieve substantially the same effect.

The cleaning roll 4 for wiping off the residual toner 3*a* turns in the direction of the arrow $A_1$, carrying scraped residual toner 3*b* to a sleeve 8 made of a non-magnetic material. The transferred toner 3*b* is forced to move onto the surface of the sleeve 8 under the magnetic force of a composite permanent magnet 7 whose S and N poles are alternately arranged, and carried toward a scraper 9 through the rotation of the sleeve 8 and the magnetic force of the permanent magnet 7. The scraper 9 is arranged to make contact with the surface of the sleeve 8 at one end thereof. Thus, the toner 3*c* as transferred is scraped off the surface of the sleeve 8 by the scraper 9. The scraper toner 3*c* moves along the surface of the scraper 9 and falls due to gravity and the magnetic force of the permanent magnet 7 turning in the direction of the arrow B, and is finally accumulated in a toner cartridge 11.

As soon as the toner 13 accumulated in the toner cartridge 11 reaches a prescribed amount, a detector means (not illustrated) detects it, informing the operator of the fact that the toner cartridge 11 should be replaced with a new one or the toner thrown away. The operator takes out the toner cartridge 11 from the cleaning device based on the information from the detector means for performing required processes. Moreover, there may be a case where the toner cartridge should be cleaned simultaneously with the supply of toner to a developing device, and when this happens it is again necessary to take out the toner cartridge 11 from the cleaning device.

However, with the cleaning device constructed as shown in FIG. 1, toner 3*d* is left behind on the scraper 9. The toner 3*d* at this time has remained on the scraper 9 due to a state of balance among gravity, magnetic force of the composite permanent magnet 7, and frictional force against the scraper 9. Thus, the toner 3*d* easily falls under a slight impact force when taking the toner cartridge 11 out of or into the cleaning device as described above.

Such a difficulty is found also in U.S. Pat. No. 4,097,140 or Japanese laid-open Patent Publication Nos. 64,274/80 and 132,372/81.

As described above, the recovered residual toner is accumulated on a portion corresponding to a toner cartridge guide as the recovered toner falls, and smears the interior of the cleaning device. Accordingly, the toner tends to smear the outer periphery of the toner cartridge and thus operator's hands, and further fall on other devices that will eventually be smeared. Another problem is that once the interior of the cleaning device is smeared, it was difficult to clean the interior of the cleaning device because of its small size, etc.

SUMMARY OF THE INVENTION

It is an object of the present invention to provide an improved cleaning device.

Another object of the present invention is to provide a cleaning device which will not be smeared by any toner as it falls upon loading/unloading of a toner cartridge.

Still another object of the present invention is to provide a cleaning device which is simple in structure and easy to assemble.

According to the present invention the above objects can be achieved by a cleaning device comprising, a photosensitive drum, a cleaning roll for removing residual toner from the photosensitive drum, a permament magnet for carrying the removed toner on the cleaning roll, and a scraper for contacting the permanent magnet. The present invention is characterized in that a rotary blade is arranged to make contact with a point of contact between the permanent magnet and the scraper.

The rotary blade is provided for scraping off the toner accumulated around said contact point through its own rotation and also for allowing the scraped toner to fall. Consequently, the toner accumulated near the contact point is forced to fall and accumulated in a toner cartridge located below the rotary blade.

BRIEF DESCRIPTION OF THE DRAWINGS

FIG. 3 is an enlarged side elevational view of a portion of the cleaning device of FIG. 2;

FIG. 5 is a schematic view partially cut away of the cleaning device of the present invention, and;

FIG. 6 is a side elevational view showing a second embodiment of the present invention.

DESCRIPTION OF THE PREFERRED EMBODIMENTS

Figure 1:
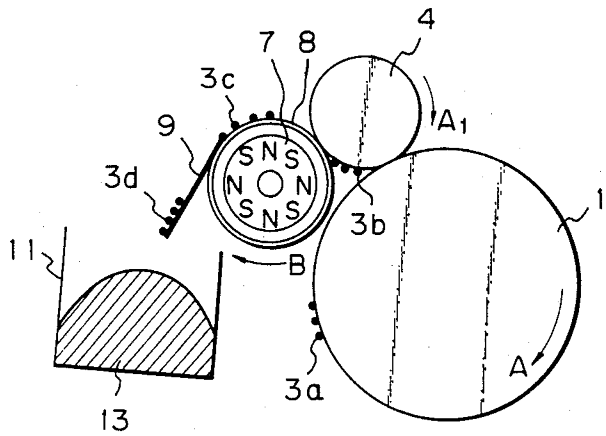
Fig. 1 PRIOR ART
FIG. 1 is a side elevational view of a prior art cleaning device.
Figure 2:
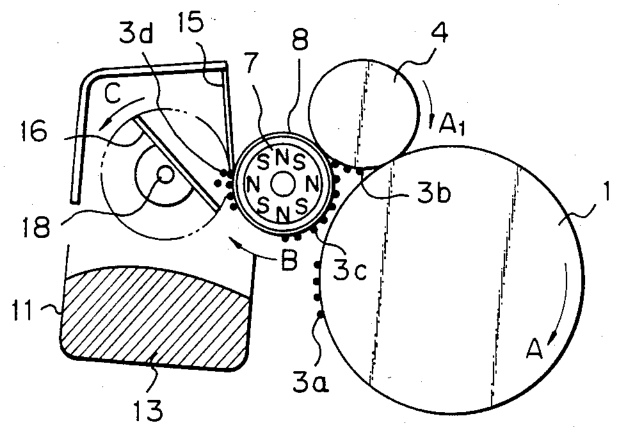
FIG. 2 is a side elevational view illustrating a first embodiment of a cleaning device according to the present invention.

FIGS. 2 and 3 illustrate one embodiment of a cleaning device according to the present invention.

Illustrated in FIGS. 2 and 3 is a photosensitive drum 4, a leaning roll 4 made of a porous elastic material, and a rotatable cylindrical device including a composite cylindrical permanent magnet 7 composed of axially extending S and N poles alternately arranged in the circumferential direction and a hollow sleeve 8 having a smooth surface made of a non-magnetic material disposed around the permanent magnet 7. A scraper 15 is made of a springy material of metal foil such as of new silver solder, stainless steel for springs, and phosphor bronze or the like, or of a plastic film such as a polyester film. The scraper 15 is positioned to keep its tip end in contact with the sleeve 8. A rotary blade 16 rotatable around a shaft 18 is arranged so as to make contact with a point 17 of contact between the sleeve 8 and the scraper 15 at its end parts 16*a*, 16*b* during the operation thereof, or to pass through near the contact point 17. As shown in FIG. 3, the gap of g between the end parts 16*a*, 16*b* of the rotary blade 16 and the point 17 of contact ranges from about −1 to +2 mm, preferably, from about +0.1 to 1 mm. Designated by reference numeral 11 is a toner cartridge, and designated by reference numeral 13 is recovered toner.

Operation of the device constructed as described above is described below. Residual toner 3*a* not transferred onto paper and adhering to the photosensitive drum 1 is wiped away by the cleaning roll 4 held in contact with the drum 1 and turning in the direction of the arrow A. The cleaning roll 4 is made of a roll-shaped porous elastic material such as urethane sponge or the like, and carries the scraped toner 3*b* to the sleeve 8. The scraper toner 3*b* moves to the surface of the sleeve 8 under the magnetic force of the cylindrical permanent magnet 7. The residual toner 3*c* on the sleeve 8 is carried in the direction of the arrow B under the magnetic force of the permanent magnet 7 and through the rotation of the sleeve 8. At this time, the cylindrical permanent magnet 7 and the sleeve 8 are both turned in the same direction of the arrow B.

As soon as the residual toner 3*c* carried on the sleeve 8 is blocked by the scraper 15, it is accumulated around the point 17 of contact between the sleeve 8 and the scraper 15. Thereafter, the accumulated toner 3*d* is scraped down by the end parts 16*a*, 16*b* of a rotary blade 16 turning in the direction of the arrow C, thus falling into the toner cartridge 11 in which it is accumulated.

During operation of the rotary blade 16, the end points 16*a*, 16*b* which contact the contact point 17 enables the residual toner 3*d* accumulated around the contact point 17 to be completely scraped down from the contact point 17. Further, the passage of the end parts 16*a*, 16*b* near a point spaced by about 1 mm from the contact point 17 enables the toner 3*d* accumulated up to a height over 1 mm to be scraped off downwardly.

Moreover, the residual toner adhering to the surface of the scraper 15 on the left side (as shown) thereof is subjected to a force transmitted in the direction toward contact point 17 under an alternating magnetic field generated by the rotation of the permanent magnet in the direction of the arrow B. Accordingly the residual toner 3*a* adhering to the surface of the photosensitive drum 1 can be collected near the contact point 17, scraped off downwardly by the rotary blade 16, and recovered.

In the above embodiment, the directions of rotation of the permanent magnet 7 and the sleeve 8 are the same as each other and there is no difference between their speeds of rotation. Therefore it is not necessary for them to be rotated independently of each other, no problems occur even without the use of any ball bearing or the like. Furthermore, providing that a permanent magnet having a sufficiently smooth surface is available for uniform contact with the scraper 15, the sleeve 8 is not required. Thus, the rotatable cylindrical device could consist of only the cylindrical permanent magnet. Moreover, although the cleaning roll 4 has been shown as the means for removing the residual toner from the surface of the photosensitive drum 1, the doctor blade disclosed in Japanese Laid-Open Patent Publication Nos. 113182/81 and 113183/81 may be used instead without any problem.

FIGS. 4A to 4D illustrate the operation of the present invention, FIGS. 4(A) to 4(D) are side elevational views showing an operating sequence thereof. As shown, the rotary blade 21 made of a magnetic material has its end parts 21*a*, 21*b* rotatable by a shaft 18 so as to pass in the neighborhood of the contact point 17 between the sleeve 8 and the scraper 15. The gap between the contact point 17 and the end parts 21*a*, 21*b* of the rotary blade 21 is selected in the range of about 0.1 to 2 mm.

With this arrangement, the toner 3*d* accumulated near the contact point 17 is partly attached by the magnetic force of the rotary blade 21 as it passes, and turned therewith. The toner 3*d* is allowed to fall into a toner cartridge (FIG. 2) and accumulated therein when the end parts 21*a*, 21*b* of the rotary blade 21 are reversed in their polarities.

The above described operations are hereinafter described in detail with reference to FIGS. 4(A) to (D).

First, the approach of one end part 21*a* of the rotary blade 21 to the contact point 17 causes the magnetic field of the permanent magnet to extend toward the rotary blade 21.

Then, the rotary blade 21 is turned, and upon reaching the position shown in FIG. 4(B), the chains of the toner 3*d* are broken. At this time, a portion of the toner 3*d* is turned together with the rotary blade 21 while being kept attached by the end part 21*a* of the blade due to residual magnetic forces.

When the rotary blade 21 as it continuously rotates reaches the position shown in FIG. 4(C), the other end part 21*b* of the rotary blade 21 comes near the contact point 17. The other end part 21*b* now contacts the toner 3*d* in the same way as the end part 21*a* did as shown in FIG. 4(A). Then, depending on the pole positions of the permanent magnet 7 the polarity of the end part 21*a* of the rotary blade 21 is reversed, allowing the toner 3*e* to fall into the toner cartridge (FIG. 2) located therebelow and to be accumulated therein.

Thereafter, upon reaching the state shown in FIG. 4(D), the toner 3*e* on the rotary blade 21 near the end part 21*a* falls off. More specifically, the permanent magnet 7 rotates as the rotary blade 21 is substantially vertically positioned as shown in FIG. 4(D) and the magnetic poles of the magnetized rotary blade 21 are changed. With these magnetic poles changed, the toner 3*e* is repelled from the rotary blade 21 so as to fall into the toner cartridge disposed as shown in FIG. 2, and accumulated therein. Then, the toner 3*f* on the other end part 21*b* starts to fall freely in the same way upon reversal of the magnetic poles of the rotary blade 21. Since the rotary blade 21 is located in the direction of fall, however, the toner 3*f* again adheres to the end part 21*b* of the rotary blade 21 because of the opposite polarity between the remanent poles. Accordingly, the toner 3f attracted by the end part 21b is turned with the rotary blade 21 and then allowed to fall when the end part 21a comes to the position shown in FIG. 4(D).

FIG. 5 shows in perspective a cleaning device according to the present invention.

Figure 4:
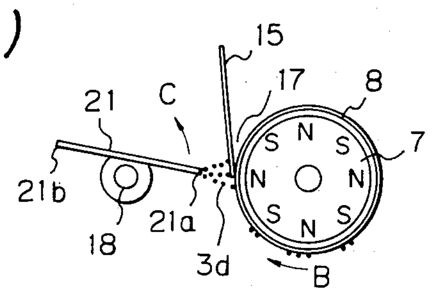
FIG. 4 is a view explaining the operation of the cleaning device relating to the present invention.
Figure 4:
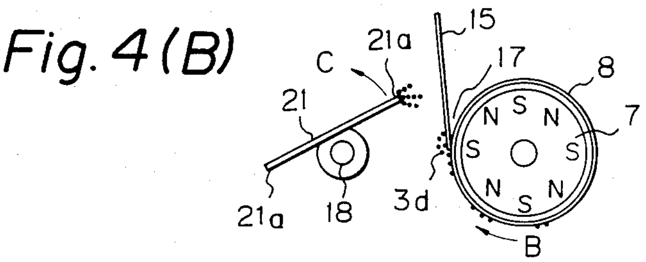
Figure 4:
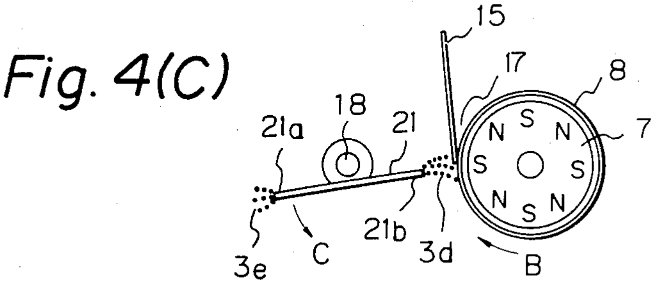
Figure 4:
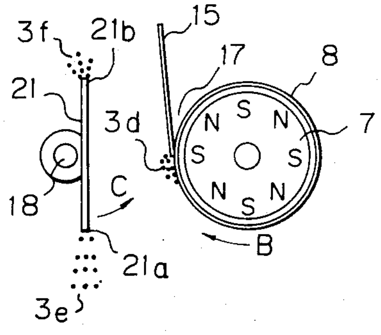

As shown in FIG. 5, the cleaning device has a cleaning roll 4, a sleeve 8, a toner cartridge 11, a toner 13, a scraper 15, a rotary blade 21, and a central shaft 18, which are the same as those shown in FIG. 4.

A cover 31 is placed entirely over the cleaning device, and an inside cover 32 covers the rotary blade 16. The inside cover 32 and the scraper 15 are screwed to a beam 33. A drawer 34 serves to draw out the toner cartridge 11 when the toner 13 scraped down as shown in FIG. 2, is accumulated therein up to a prescribed amount. Also provided are a knob 35 for fixing the toner cartridge 11 in the drawer 34, a rotary bearing 36 for the cleaning roll 4, which is easily replaceable when the cleaning roll 4 is smeared or destroyed, a bearing 37 for the permanent magnet 7 (FIG. 2) and a bearing 38 for the rotary shaft 18 of the rotary blade 21.

FIG. 6 is a side elevational view showing a second embodiment of the present invention. In the second embodiment, the positions of the scraper and the rotary blade are changed from those of the first embodiment as described below in detail.

Illustrated in FIG. 6 are a permanent magnet 7, a sleeve 8, and a contact point 17. Also shown are a scraper 22 and a rotary blade 23 constructed of a magnetic or non-magnetic material as in the first embodiment. As illustrated, the scraper 22 is arranged in a substantially horizontal position, while the contact point 17 between the scraper 22 and the sleeve 8 is located below the permanent magnet 7. The rotary blade 23 is rotatable about the shaft 24, and arranged such that the end parts 23a, 23b will make contact with the contact point 17 or pass in the neighborhood thereof upon rotation thereof.

With the aforesaid construction, each member operates in the same manner as described above in the first embodiment, permitting the residual toner to fall without fail into the toner cartridge located below for toner recovery.

With the embodiments according to the present invention, as described above, the residual toner wiped away from the surface of the photosensitive drum is carried by means of the permanent magnet and the carried toner is blocked by the scraper. Then, the toner as blocked and accumulated is scraped off downwardly by the rotary blade. The present invention has the following advantages:

It may be avoided that the residual toner adhere unstably to and remain on the point of contact between the scraper for blocking the remaining toner and the permanent magnet or that the sleeve prevent scraped toner from falling due to any impact produced upon removing or inserting the toner cartridge. Thus, the invention avoids deterioration of the interior of the device as well as the printing quality of.

Since the rotary blade is rotated in repetitive cycles, the toner is not liable to remain on the rotary blade, and does not fall due to any impact caused upon toner and cartridge replacement.

Further, the permanent magnet and the drive system are simple in structure because the direction in which the permanent magnet and the sleeve enclosing the magnet are rotated are the same as each other. Therefore, the cleaning device can easily be assembled, serviced, and inspected.

What is claimed is:

1. A photosensitive drum cleaning device in an electrophotographic recording system, comprising:

a photosensitive drum for attracting magnetic toner to the peripheral surface thereof and transferring the magnetic toner to paper;

a cleaning roll contacting said drum for wiping excess magnetic toner off of said surface of said drum;

means, comprising a rotatable cylindrical device including a rotatable cylindrical permanent magnet, for carrying the toner wiped off of said surface of said drum on a peripheral surface of said cylindrical device under the magnetic forces of said permanent magnet;

a scraper making contact with said peripheral surface so as to block the toner carried on said peripheral surface; and means for removing toner accumulated at a point of contact between said scraper and said peripheral surface, said removing means including a rotary blade formed of magnetic material, rotatable to pass sufficiently close to said point of contact between said peripheral surface and said scraper to scrape off the toner blocked by said scraper and carry away the toner with the toner held to said blade by magnetic attraction.

2. A photosensitive drum cleaning device according to claim 1, wherein said scraper is made of a springy material.

3. A photosensitive drum cleaning device according to claim 1, where said rotatable cylindrical device includes a hollow sleeve of a nonmagnetic material housing said permanent magnet therein.

4. A photosensitive drum cleaning device according to claim 3, wherein said permanent magnet and said sleeve are turned in one direction.

5. A photosensitive drum cleaning device according to claim 1, wherein said permanent magnet comprises means for magnetizing an end of said blade with said permanent magnet as said end passes said point of contact and attaches toner thereto, and said permanent magnet further comprises means for changing the polarity of said end with rotation of said permanent magnet after said end has rotated away from said point of contact, thereby to release the toner from said end of said blade.

6. A photosensitive drum cleaning device according to claim 1, wherein said blade includes first and second ends which alternately pass said point of contact as said blade rotates so as to be magnetized by said permanent magnet as they pass said point of contact, whereby the polarity of one of said first and second ends to which toner is magnetically held is reversed to thereby release the toner from said one of said first and second ends when the other of said first and second ends passes said point of contact while the polarity of said permanent magnet at said point of contact is opposite to the polarity of said one of said first and second ends prior to the reversal thereof.

* * * * *